US005617987A

United States Patent [19]
Howard et al.

[11] Patent Number: 5,617,987
[45] Date of Patent: Apr. 8, 1997

[54] SAFETY GUARD FOR FIBER PROCESSING UNIT

[75] Inventors: James E. Howard, Leeds, Ala.; Enrico Merli, Piacenza, Italy

[73] Assignee: Fibres South, Inc., Birmingham, Ala.

[21] Appl. No.: 439,153

[22] Filed: May 11, 1995

[51] Int. Cl.⁶ .............................. F16P 3/08; B65H 20/00
[52] U.S. Cl. ........................ 226/189; 226/190; 192/133
[58] Field of Search ..................................... 226/168, 189, 226/190; 192/126, 127, 133, 136

[56] References Cited

U.S. PATENT DOCUMENTS

| 1,212,319 | 1/1917 | Bretsynder . |
| 1,625,071 | 4/1927 | Balzer ................................ 192/133 |
| 1,646,980 | 10/1927 | Peglow . |
| 2,201,244 | 5/1940 | Root . |
| 2,683,516 | 7/1954 | Pierrepont . |
| 2,888,123 | 5/1959 | Madden . |
| 2,934,189 | 4/1960 | Wilson et al. . |
| 3,783,709 | 1/1974 | Scott ................................. 192/133 |
| 3,902,582 | 9/1975 | Cross . |
| 3,933,089 | 1/1976 | Spooner . |
| 4,282,963 | 8/1981 | Kafura . |
| 5,241,903 | 9/1993 | Lampic . |

FOREIGN PATENT DOCUMENTS 1550779  8/1979  United Kingdom ................. 192/133

Primary Examiner—Daniel P. Stodola
Assistant Examiner—Matthew A. Kaness
Attorney, Agent, or Firm—Veal & Marsh

[57] ABSTRACT

A safety apparatus for use with a fiber processing unit having a plurality of rotating godet rollers. The apparatus includes a safety gate, positioned between an operator and the godet rollers, having a plurality of apertures through which a long-handled cutting tool may be extended. A plurality of guides mounted to the frame of the godet unit, each extending adjacent and substantially parallel to one of the godet rollers, limit the range of movement of the cutting tool to the proper position for cutting wrap from the godet rollers.

18 Claims, 4 Drawing Sheets

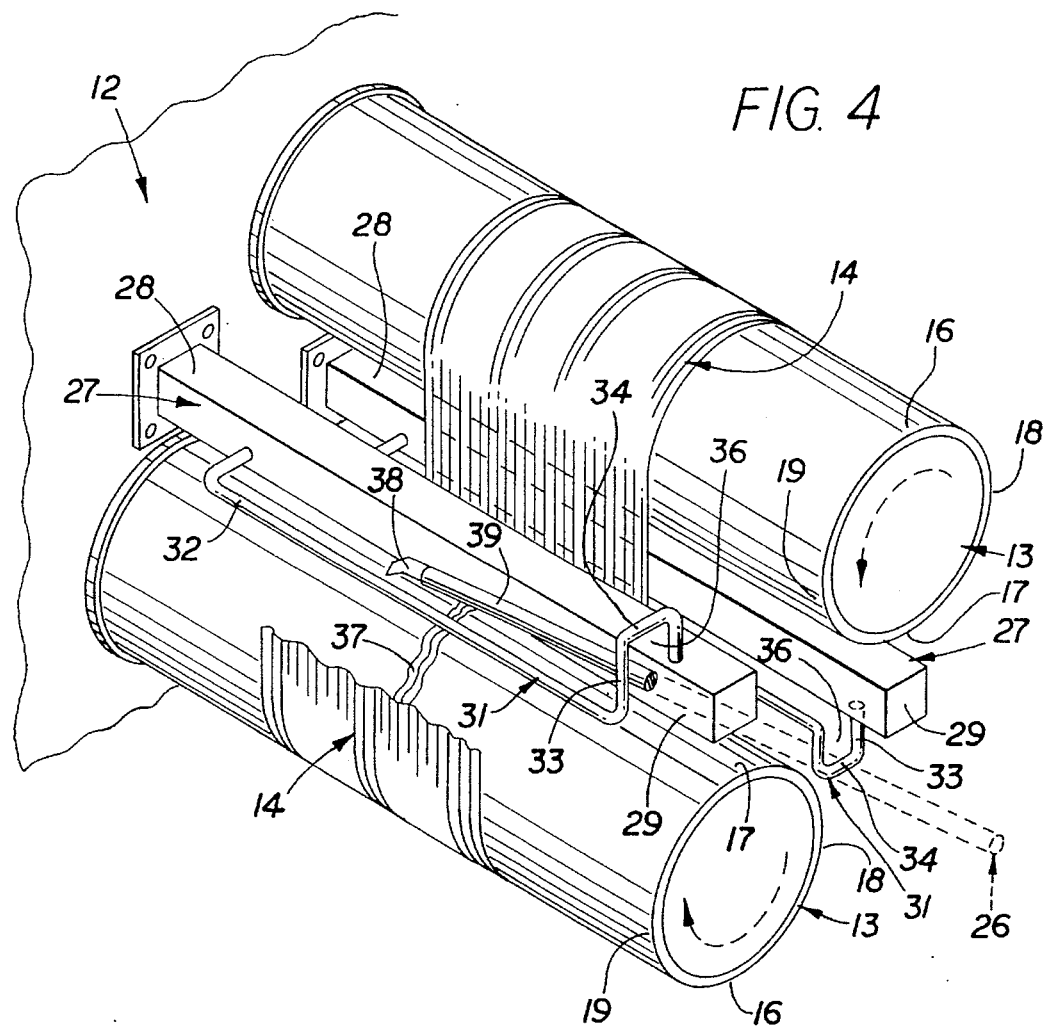
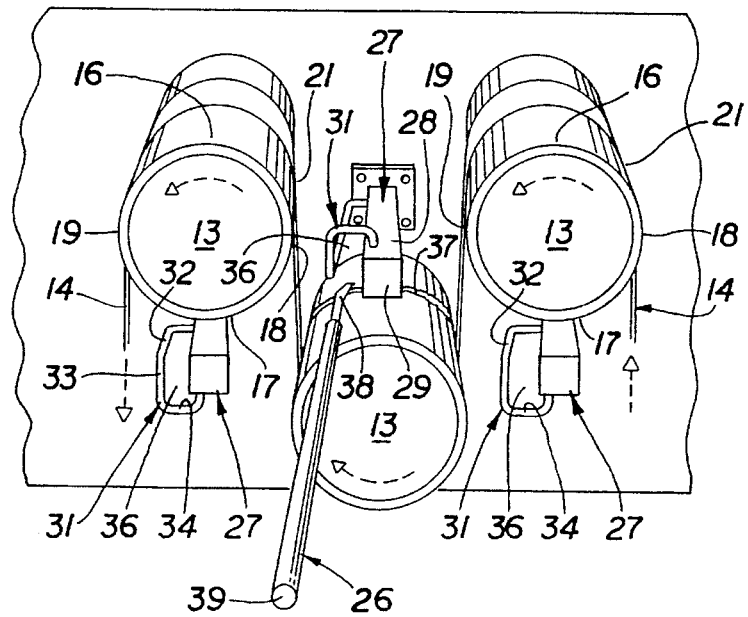

SAFETY GUARD FOR FIBER PROCESSING UNIT

FIELD OF THE INVENTION

The present invention relates to safety guards. More particularly, the present invention relates to safety guards designed to provide a barrier between a human operator and equipment with moving parts. Still more particularly, the present invention relates to safety guards for use in fiber or material processing applications wherein a human operator must have limited access to a piece of equipment while it is operational.

BACKGROUND OF THE INVENTION

Safety guards are commonly used in many applications where a human operator must be shielded from moving machinery. The specific configuration of these guards varies, depending upon the particular application for which the guard is used.

In the fields of textile manufacturing and the processing and manufacture of both natural and man-made fibers, the use of units including rotating godet rollers (also referred to as godet wheels or godets) is common. A godet unit typically includes one or more upper godet rollers and one or more lower godet rollers which rotate in different directions. A bundle of fibers is entrained around the godet rollers and from one roller to the next. In the area where the fibers initially contact the rotating godet roller, a "nip" or pinch point is formed. The godet rollers are frequently operated at relatively high speeds for quality and efficiency purposes and consequently a need exists to prevent inadvertent contact with the rollers and fibers, which may lead to entrainment of an object in the fibers and about the godet rollers.

During the processing of the fibers by the godet unit, it is common for one or more of the fibers to break regardless of the processing speed. The broken fibers will often separate from the other fiber and begin to wrap around one of the godet rollers. If left unattended, the "wrap" will build up on the godet roller, ultimately requiring that the processing line be shut down for a period of time, until the roller can be cleared of the wrap. Conversely, if the wrap is severed shortly after it begins, the severed fiber will rejoin the other fiber and proceed through the remainder of the processing line.

The frequency of occurrence of wraps in synthetic fiber processing depends upon a number of factors, including but not limited to atmospheric humidity, processing temperature and the type of raw materials from which the fibers are being manufactured. It is common for wraps to occur as frequently as once every ten minutes. The nature of the fiber processing line is such that it should not be stopped and started abruptly. The line must be gradually brought to a halt, and upon restarting, the speed of the line is gradually increased until full processing speed is attained. The time required to stop the line to cut a wrap and bring it back up to full speed is ten to fifteen minutes, and during the restarting, additional wraps may be generated.

The safety guards currently available with godet units include a solid transparent shield. While the currently available shields allow an operator to see when a wrap has started, they prevent the operator from cutting the wrap while the shield is in position. Because of the significant amount of down time caused by stopping the line, it has become standard practice in the industry for operators to reach into the godet unit to cut a wrap while the godet rollers are operating.

Another existing safety mechanism is a shut-off cable which is suspended along the length of the godet unit, between the operator and the godet rollers. In the event an operator falls or is pulled toward the godet rollers, the weight of his or her body against the cord activates a mechanism to stop the rotation of the godet rollers. While it is possible that this safety mechanism may limit the extent of an operator's injuries, it is ineffective as a measure to prevent entrainment.

While it is quite common in the industry for properly trained operators to safely cut wraps with tools such as utility knives, a need exists in the industry for a safety apparatus that will allow operators of a godet unit to cut a wrap from an operating godet roller, while reducing the risk of the operator or his tools being caught and drawn into the godet rollers.

SUMMARY OF THE PRESENT INVENTION

With the foregoing in mind, the principal object of the present invention is to provide a safety apparatus for use with a godet unit which will reduce the exposure and therefore the chances for an injury to an operator while allowing the operator limited access to a godet unit operating at processing speed.

Another object of the invention is to provide a mechanism which allows a manufacturer to maintain production efficiency while protecting operators from injury.

These and other objects of the present invention are accomplished through the use of a safety shield having a plurality of apertures through which a long-handled cutting tool may be extended, and a plurality of guides which limit the range of movement of the cutting tool to the proper position for cutting a wrap from a godet roller.

BRIEF DESCRIPTION OF THE DRAWINGS

The foregoing objects and advantages of the present invention for an improved safety guard for a fiber processing unit will be more readily understood by one skilled in the art by referring to the following detailed description of a preferred embodiment and to the accompanying drawings which form a part of this disclosure, and wherein:

FIG. 4 is a perspective view of adjacent godet rollers and guide means, showing the use of an elongated cutting tool to cut a wrap;

FIG. 5 is a perspective view of adjacent godet rollers and guide means, also showing the use of an elongated cutting tool to cut a wrap.

DETAILED DESCRIPTION OF THE PREFERRED EMBODIMENT

Figure 1:
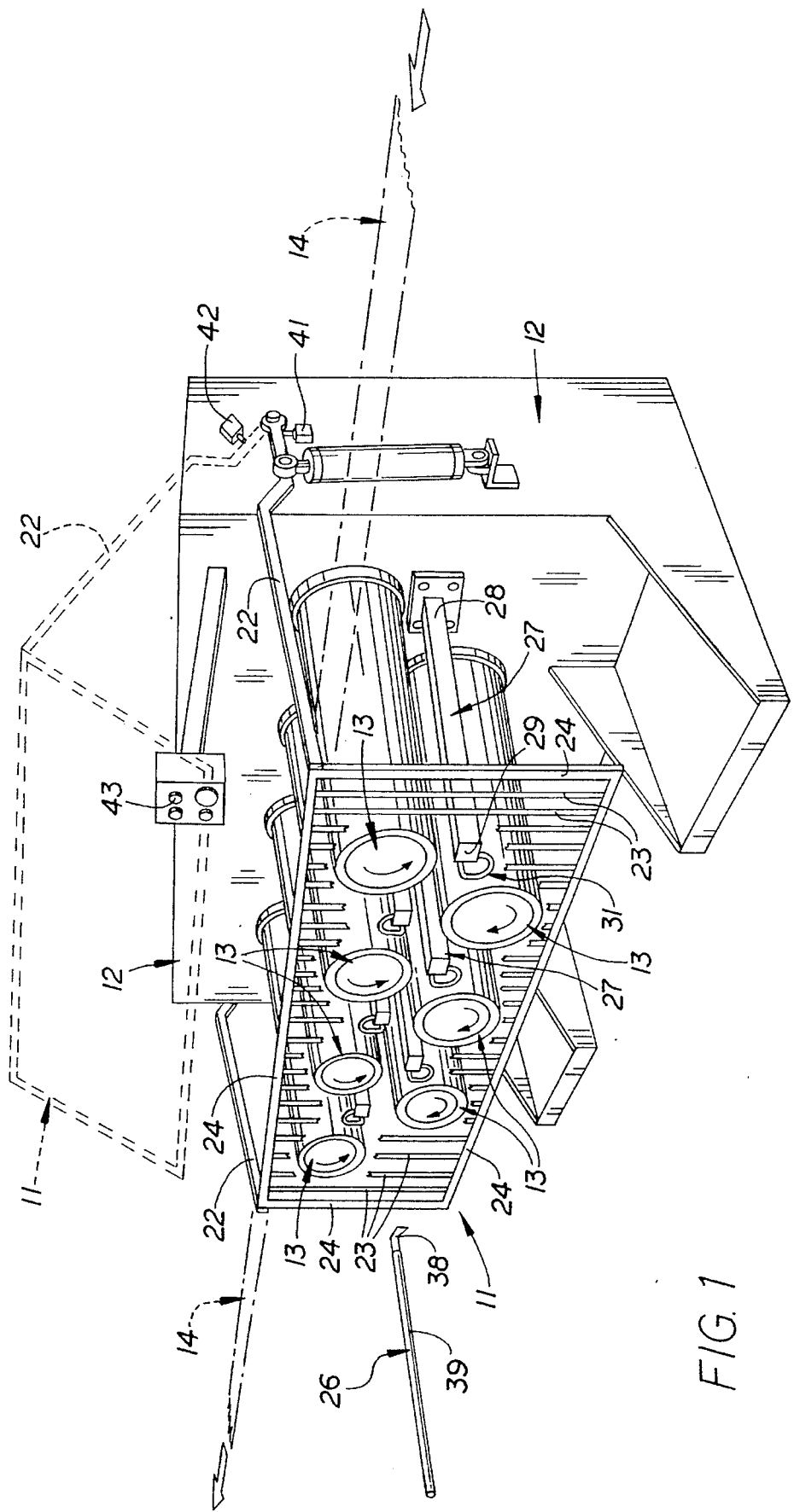
FIG. 1 is a perspective view of a godet unit, showing the safety gate of the present invention in the operative position.
Figure 2:
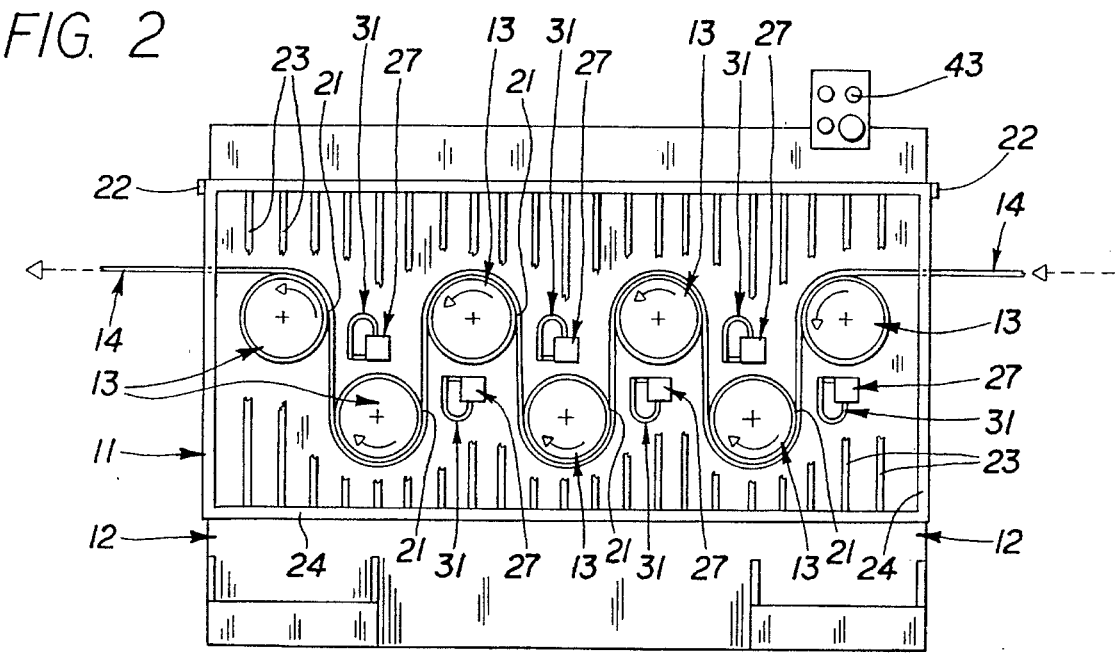
FIG. 2 is a front view of a godet unit, showing the relative positions of the godet rollers and the guide means.
Figure 3:
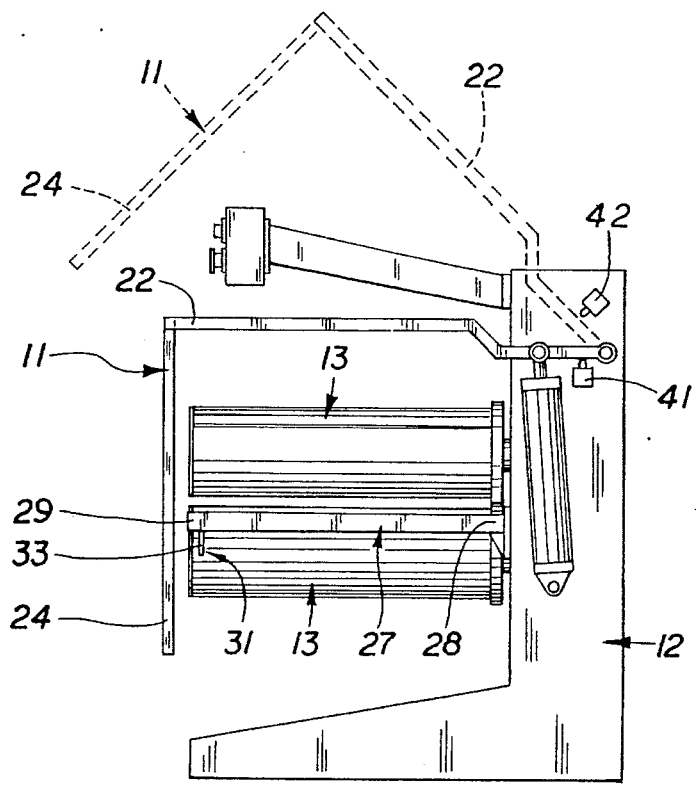
FIG. 3 is a side view of the godet unit, showing the position of limit switches adjacent the mounting arms of the safety gate.

As may be seen in FIGS. 1 and 2, the present invention includes a safety gate 11 which is pivotally mounted to the frame 12 of a fiber processing unit. A plurality of godet rollers 13 are mounted on the front side of the frame 12 such that their respective axes of rotation are substantially parallel. As shown in FIGS. 4 and 5, fibers 14 are entrained over the godet rollers 13 such that each of the godet rollers 13 is partially circumscribed by the fibers 14, defining a fiber side 16, on which the fibers 14 are in contact with the peripheral surface of the godet roller 13, and a free side 17, on which the peripheral surface of the godet roller 13 does not contact the fibers 14. Each godet roller 13 further has a feed side 18 on which the fibers 14 make initial contact with the godet roller 13, and a downstream side 19, on which the fibers 14 separate from the godet roller 13 as they move toward the adjacent roller 13. A "nip" 21 or pinch point is defined along the length of the feed side 18 of each godet roller 13 at the point at which the fibers 14 contact the godet roller 13. The safety gate 11 is movable between an obstructing position, in which it provides a barrier between an operator standing at an operator's position in front of the unit and the godet rollers 13, as shown in FIGS. 1 and 3, and a clear position, as shown in phantom in FIGS. 1 and 3.

The safety gate 11 has a pair of mounting arms 22 through which the gate 11 is mounted to the frame 12. The gate includes a plurality of spaced vertical bars 23, the ends of which are affixed to a peripheral frame 24 of the safety gate 11. The bars 23 are spaced sufficiently apart to allow an elongated cutting tool 26 to be extended between adjacent bars 23, but sufficiently close together that an operator cannot extend an arm between the bars 23.

Figure 6:
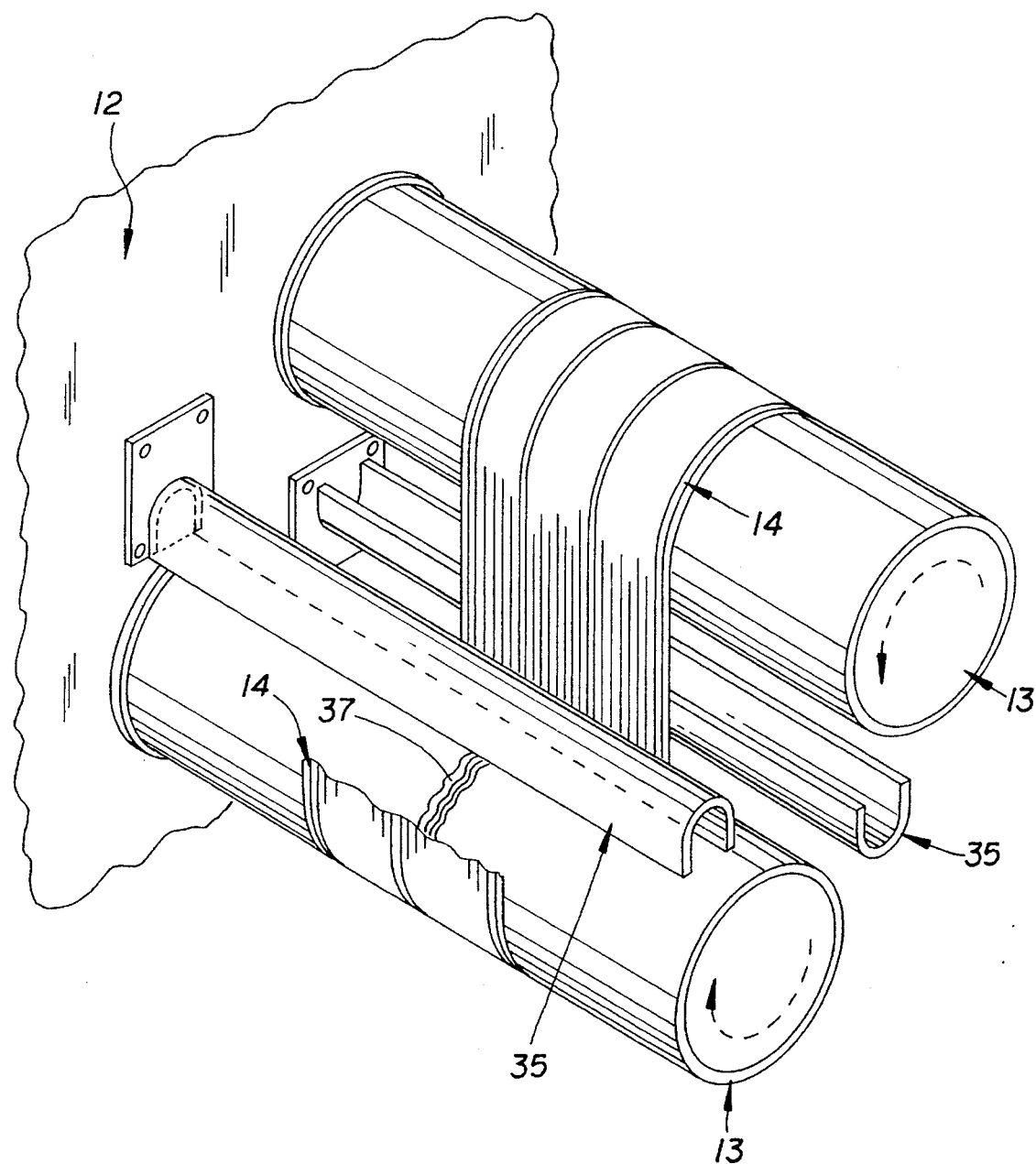
FIG. 6 is a perspective view of adjacent godet rollers and an alternate embodiment of guide means.

As best shown in FIGS. 4 and 5, a guide means associated with each godet roller is provided, including a plurality of guide bars 27, having a first end 28 and a second end 29, affixed at their first ends 28 to the frame 12 such that each guide bar 27 is positioned adjacent and extends substantially parallel to the axis of rotation of one of the godet rollers 13. Each guide bar 27 is positioned on the free side 17 of the adjacent godet roller 13. A stabilizing rod 31 is affixed to the side of each guide bar 27 proximal the downstream side 19 of the adjacent godet roller 13. The stabilizing rod 31 has an elongated side portion 32 which extends substantially parallel to and is spaced from the guide bar 27. A substantially U-shaped portion 33 of the stabilizing rod 31 is affixed to the guide bar 27 proximal its second end 29, such that the U-shaped portion 33 opens toward the downstream side 19 of the adjacent godet roller 13. The base 34 of the U-shaped portion 33 of the stabilizing rod 31 is substantially parallel to the tangent of the closest portion of the surface of the adjacent godet roller 13, such that the base 34 forms a fulcrum against which the handle 39 of the elongated cutting tool 26 may be urged when an operator is severing a wrap 37 from the adjacent godet roller 13 with the cutting edge 38 of the elongated cutting tool 26. The elongated side portion 32 of the stabilizing rod 31 and the guide bar 27 define a guide slot or insertion area 36 therebetween into which the elongated cutting tool 26 is inserted for cutting wrap. Any movement of the tool 26 transverse to the handle 39 and tangent to the godet roller 13 is arrested by the guide means. The insertion area 36 is on the downstream side 19 of the godet roller 13 so that the risk of the cutting tool 26 being drawn into the nip 21 during the process of severing the wrap 37 is eliminated. Although a stabilizing rod 31 is used in the preferred embodiment, it should be clear to one skilled in the art that any number of configurations of braces could be used for the guide means, as long as the brace presents a physical barrier to the lateral movement of the elongated cutting tool while allowing the tool to be inserted along the length of the godet roller. An alternate embodiment of the guide means 35 is shown in FIG. 6.

The present invention is used in the following manner. When a strand or plurality of fibers break and form a wrap 37 on a godet roller 13 during processing, an operator inserts a long-handled cutting tool 26 between the vertical bars 23 in the safety gate 11 and into the insertion area 36 between the guide bar 27 and the stabilizing rod 31. The cutting edge 38 of the tool 26 is placed against the surface of the roller 13 at a point beyond the wrap 37, such that the wrap 37 is between the cutting edge 38 of the tool and the operator. The operator draws the cutting tool 26 toward the safety gate 11, until the cutting edge 38 severs the wrap 37. If additional force is necessary to cut through the wrap 37, the handle 39 of the cutting tool 26 may be urged against the U-shaped portion 33 of the stabilizing rod 31, using the U-shaped portion 33 as a fulcrum. The guide means prevents the tool from being pulled around the godet roller with the wrap.

The safety apparatus of the present invention is most effective if used in conjunction with conventional safety devices known in the art. As shown in FIGS. 1 and 3, the present invention may be used with a limit switch 41 which is operatively connected to the drive mechanism for the godet rollers 13 such that the rollers 13 will stop rotating if the mounting arm 22 of the safety gate 11 is raised out of contact with the switch 41. Since it is necessary at the initial phase of processing that the fibers 14 be manually threaded through the godet rollers 13 while the rollers are rotating at a reduced speed, a mechanism may be provided to allow the rollers 13 to rotate for a brief period of time with the safety gate 11 raised. As best shown in FIG. 1, a godet unit may be provided with a limit switch 42 which detects when the safety gate is in the fully raised position. The limit switch 42 is operatively connected with the processing equipment downstream of the godet unit such that the downstream equipment is disabled when the gate is raised. The limit switch 42 is also operatively connected with a delay switch 43, such that depressing the delay switch 43 while the mounting arm 22 of the safety gate 11 is engaging the limit switch 42 allows an operator to bypass the limit switch 41 and run the godet unit at reduced speed for a brief period of time while the safety gate 11 is raised, to allow threading of the godet unit.

While I have shown my invention in two forms, it will be obvious to those skilled in the art that it is not so limited but is susceptible of various changes and modifications without departing from the spirit thereof.

Having set forth the nature of the invention, what is claimed is:

1. A safety apparatus in combination with a unit in a fiber processing line, said unit having a frame supporting a plurality of driven godet rollers, said godet rollers having substantially parallel axes of rotation, each of said godet rollers having a feed side and a downstream side, wherein fibers are entrained over said godet rollers such that each of said godet rollers is partially circumscribed by said fibers on a fiber side and is clear of said fibers on a free side, and such that a nip is defined between said fibers and each of said godet rollers on said feed side of said godet rollers, said safety apparatus comprising:

(a) a safety gate, pivotally mounted to said frame and movable between an obstructing position and a clear position, said gate having a plurality of openings through which an elongated cutting tool may be extended to access said free side of said godet rollers while said safety gate is in said obstructing position; and (b) guide means, mounted to said frame such that said guide means extends substantially parallel to the axis of rotation of one of said plurality of godet rollers proximal said free side of one of said plurality of godet rollers, for preventing an elongated cutting tool from being drawn into said nips.

2. A safety apparatus in combination with a unit in a fiber processing line, said unit having a frame supporting a plurality of driven godet rollers, said godet rollers having substantially parallel axes of rotation, each of said godet rollers having a feed side and a downstream side, wherein fibers are entrained over said godet rollers such that each of said godet rollers is partially circumscribed by said fibers on a fiber side and is clear of said fibers on a free side, and such that a nip is defined between said fibers and each of said godet rollers on said feed side of said godet rollers, said safety apparatus comprising:

(a) a safety gate, movably supported for selective movement between an obstructing position and a clear position, said gate having a plurality of openings through which an elongated cutting tool may be extended to access said free side of said godet rollers while said safety gate is in said obstructing position; and (b) guide means for preventing an elongated cutting tool from being drawn into said nips, said guide means comprising a guide bar mounted to said frame such that said guide bar extends substantially parallel to the axis of rotation of one of said plurality of godet rollers proximal said free side of said godet roller.

3. An apparatus as defined in claim 2, wherein said guide means further comprises a stabilizing member, said member rigidly affixed to said guide bar such that said elongated cutting tool may be extended intermediate said guide bar and a portion of said stabilizing member.

4. An apparatus as defined in claim 3, wherein said guide bar has a front end and wherein said stabilizing member comprises a stabilizing rod having a U-shaped portion affixed to said front end of said guide bar such that said U-shaped portion opens toward said downstream side of said godet roller.

5. An apparatus as defined in claim 4 wherein said stabilizing rod further comprises an elongated side portion extending substantially parallel to and spaced from said guide bar.

6. An apparatus as defined in claim 3, further comprising means for stopping the rotation of said godet rollers when said safety gate is not in said obstructing position.

7. A safety apparatus in combination with a material processing unit having a plurality of godet rollers mounted on a frame for parallel driven rotation, wherein said material is entrained for movement over a portion of the surface of each godet roller of said plurality of godet rollers from a feed side to a downstream side, said apparatus comprising:

(a) a safety gate, having a plurality of openings, said gate selectively movable between a clear position and an obstructing position; and (b) guide means mounted to said frame such that said guide means extends substantially parallel to an axis of rotation of one of said plurality of godet rollers proximal a free side, rotationally between said downstream side and said feed side and opposite said portion of the surface, of said one of said plurality of godet rollers, and cooperatively positioned relative to one of said plurality of openings to limit the movement of a tool inserted through one of said plurality of openings in said safety gate to an area proximal said downstream side of one of said plurality of godet rollers.

8. A safety apparatus in combination with a material processing unit having a plurality of godet rollers mounted on a frame for parallel driven rotation, wherein said material is entrained for movement over a of the surface of each godet roller of said plurality of godet rollers from a feed side to a downstream side, said entrained material defining a fiber side and a free side of each godet roller of said plurality of godet rollers, said apparatus comprising:

(a) a safety gate, having a plurality of openings, said gate selectively movable between a clear position and an obstructing position; and (b) guide means cooperatively positioned relative to one of said plurality of openings to limit the movement of a tool inserted through one of said plurality of openings in said safety gate to an area proximal said downstream side of one of said plurality of godet rollers, said guide means comprising a guide bar, having and first end and a second end, said first end mounted to said frame such that said guide bar extends substantially parallel to one of said plurality of godet rollers proximal said free side of said godet roller.

9. An apparatus as defined in claim 8, wherein said guide means further comprises a stabilizing member, said stabilizing member positioned laterally of said guide bar.

10. An apparatus as defined in claim 9, wherein said stabilizing member comprises a barrier portion, spaced from said guide bar and extending substantially parallel thereto, defining an insertion area for said tool intermediate said barrier portion and said guide bar.

11. An apparatus as defined in claim 10, wherein said stabilizing member further comprises a fulcrum portion proximal said second end of said guide bar, said fulcrum portion extending laterally of said guide bar toward said barrier portion of said stabilizing member.

12. An apparatus as defined in claim 11, wherein said stabilizing member comprises a rod, and wherein said fulcrum portion of said stabilizing member is substantially U-shaped and opens toward said downstream side of said godet roller.

13. A safety apparatus in combination with a unit in a fiber processing line, said unit having a plurality of driven godet rollers, said godet rollers having substantially parallel axes of rotation, each of said godet rollers having a feed side and a downstream side, wherein fibers are entrained over said godet rollers such that each of said godet rollers is partially circumscribed by said fibers on a fiber side and is clear of said fibers on a free side, and such that a nip is defined between said fibers and each of said godet rollers on said feed side of said godet rollers, said safety apparatus comprising:

(a) safety gate, movably supported for selective movement between an obstructing position and a clear position, said gate having a plurality of openings through which an elongated cutting tool may be extended to access said free side of said godet rollers while said safety gate is in said obstruction position; an (b) guide means for preventing an elongated cutting tool from being drawn into said nips, said guide means comprising an elongated brace extending adjacent and substantially parallel to said free side of one of said plurality of godet rollers, said brace having a first side and a second side, said first side spaced laterally from said second side such that an area is defined therebetween for insertion of said elongated cutting tool.

14. An apparatus as defined in claim 13, wherein said guide means further comprises a fulcrum portion intermediate said first side and said second side of said elongated brace.

15. A safety apparatus in combination with a material processing unit having a plurality of godet rollers mounted on a frame for parallel driven rotation, wherein said material is entrained for movement over a portion of the surface of each godet roller of said plurality of godet rollers from a feed side to a downstream side, said apparatus comprising:

(a) a safety gate, having a plurality of openings, said gate selectively movable between a clear position and an obstructing position; and (b) guide means cooperatively positioned relative to one of said plurality of openings to limit the movement of a tool inserted through one of said plurality of openings in said safety gate to an area proximal said downstream side of one of said plurality of godet rollers, said guide means comprising an elongated brace extending adjacent and substantially parallel to said free side of one of said plurality of godet rollers, said brace having a first side and a second side, said first side spaced laterally from said second side such that an area is defined therebetween for insertion of said elongated cutting tool.

16. An apparatus as defined in claim 15, wherein said guide means further comprises a fulcrum portion intermediate said first side and said second side of said elongated brace.

17. A safety apparatus in combination with a material processing unit having a plurality of godet rollers mounted on a frame for parallel driven rotation, wherein said material is entrained for movement over a portion of the surface of each godet roller of said plurality of godet rollers from a feed side to a downstream side, said apparatus comprising:

(a) a safety gate, having a plurality of openings, said gate selectively movable between a clear position and an obstructing position; and (b) guide means cooperatively positioned relative to one of said plurality of openings to limit the movement of a tool inserted through one of said plurality of openings in said safety gate to an area proximal said downstream side of one of said plurality of godet rollers, said guide means comprising a U-shaped member opening toward said godet roller having opposing side portions spaced apart for the insertion of a long-handled cutting tool therethrough and extending toward said godet roller sufficiently to arrest movement of said tool tangentially of said godet roller.

18. A safety apparatus in combination with a unit in a fiber processing line, said unit having a plurality of driven godet rollers, said godet rollers having substantially parallel axes of rotation, each of said godet rollers having a feed side and a downstream side, wherein fibers are entrained over said godet rollers such that each of said godet rollers is partially circumscribed by said fibers on a fiber side and is clear of said fibers on a free side, and such that a nip is defined between said fibers and each of said godet rollers on said feed side of said godet rollers, said safety apparatus comprising:

(a) a safety gate, movably supported for selective movement between an obstructing position and a clear position, said gate having a plurality of openings through which an elongated cutting tool may be extended to access said free side of said godet rollers while said safety gate is in said obstructing position; and (b) guide means, having opposing side portions spaced apart for the insertion of a long-handled cutting tool therethrough and extending toward said godet roller sufficiently to arrest movement of said tool tangentially of said godet roller, and spaced from said safety gate and adjacent one of said plurality of godet rollers, for preventing an elongated cutting tool from being drawn into said nips.

\* \* \* \* \*